UNITED STATES PATENT OFFICE.

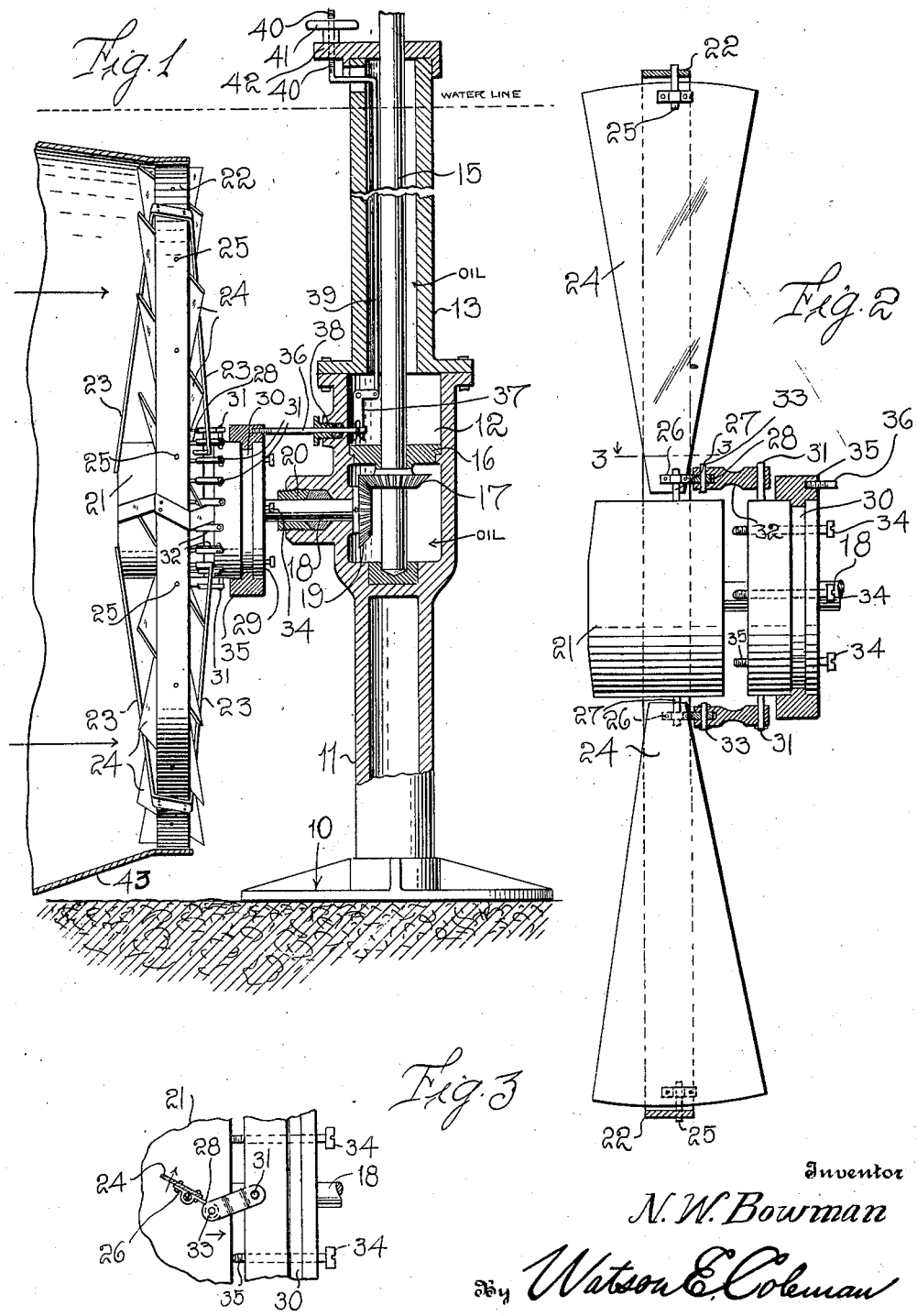

NATHAN W. BOWMAN, OF DURAND, WISCONSIN.

CURRENT-MOTOR.

1,313,457.     Specification of Letters Patent.     Patented Aug. 19, 1919.

Application filed March 6, 1918. Serial No. 220,852.

*To all whom it may concern:*

Be it known that NATHAN W. BOWMAN, citizen of the United States, residing at Durand, in the county of Pepin and State of Wisconsin, has invented certain new and useful Improvements in Current-Motors, of which the following is a specification, reference being had to the accompanying drawings.

This invention relates to water motors, and particularly to current water motors.

The general object of the invention is the provision of a very simple current motor of this character, including a current wheel having vanes and a mounting or support for the wheel, whereby it may be supported in a stream, and means for transmitting the power of the current wheel to any desired point.

A further object is to provide a current wheel of this character with improved means whereby the vanes may be inclined relative to the plane of the wheel, so as to secure a maximum of power from the wheel in accordance with the work to be done.

Still another object is to provide means whereby the vanes may be turned from the angle of maximum power to a position where the vanes will be parallel to the axis of the wheel to thereby prevent the operation of the wheel.

A further object is to provide means for adjustably predetermining the angle to which the vanes may be shifted by the action of the current on the vanes.

Still another object is to provide a support for the current wheel including a hollow housing in which the gear wheels and operating shafts are disposed, this housing being of a length to extend above the water line and being adapted to receive within it oil, other lubricant, or a non-freezing compound.

Other objects will appear in the course of the following description.

My invention is illustrated in the accompanying drawings, wherein:

Figure 1 is a side elevation partly in section of my improved motor;

Fig. 2 is a side elevation partly in section of the wheel and its blade adjusting mechanism; and Fig. 3 is a section on the line 3—3 of Fig. 2.

Referring to these drawings, and particularly to Fig. 1, it will be seen that my mechanism comprises a vertically disposed hollow standard or housing formed as illustrated of a base 10, a section 11 rising from and supported upon the base and enlarged to provide a chamber 12, and a section 13 which has flanges coacting with flanges on the section 11, this section 13 extending to a point above the level of the water. The lower part of the section 11 is hollow and at the bottom of the chamber 12 there is formed a step bearing for the vertical shaft 15, which extends up through the chamber 12 and through the housing section 13 and forms the transmission shaft whereby power is transmitted from the wheel to the mechanism to be driven thereby. Disposed within the chamber 12 is a removable partition 16 through which the shaft 15 passes and this shaft carries upon it the beveled gear wheel 17.

Extending through the walls of the chamber 12 at right angles to the shaft 15 is a shaft 18 which carries a beveled gear wheel 19 intermeshing with the beveled gear wheel 17, this shaft passing through the gland or stuffing box 20 and mounted upon the shaft 18 is the hub 21 of the water wheel proper. Disposed concentrically to this hub and at any suitable distance therefrom is the rim 22 of the wheel, which may be of flat metal and connecting this rim with the hub are a plurality of spokes, these being formed by strips of metal 23, each strip being attached at one end to the forward end of the hub, then extending upward and over the rim 22 and then downward and rearward to the inner face of the hub. Each of these strips is angularly disposed as will be later stated.

Disposed in radiating relation from the hub are a plurality of vanes or blades 24, these vanes being wider at their outer ends than at their inner. Each of these vanes at its outer end carries a pivot pin 25 which engages and has rotative bearing in a perforation in the rim 22 and at its lower end each vane is provided with a clip 26 which engages a pin 27 extending outward from the hub 21. It will be noted that the pins 25 and 27 are not disposed in alinement with the axis of the corresponding blade or vane, but disposed to one side of said axis for a purpose which will be later stated. Extending from each vane is an arm 28 which, as illustrated, may form part of the clip 26.

For the purpose of shifting the vanes from a position where they are parallel to the axis of the hub 21 to a position at an angle to this last named inoperative position, I mount upon the shaft 18 the longitudinally shiftable collar 29, which is formed with a circumferential groove 30, and this collar 29 is provided with a plurality of pins 31 which pivotally engage links 32, each of these links being pivotally connected as by a pin 33 to the corresponding arm 28. It will be obvious therefore that upon shifting the collar 29 in one direction or the other the blades will be shifted from an inoperative to an operative position and that the angle of the blades to the axis of the shaft will depend upon the extent to which the collar 29 may be shifted toward the left in Fig. 2.

I do not wish to be limited to any particular means for adjustably limiting or stopping the movement of the collar 29 toward the hub 21, but I have illustrated for this purpose a plurality of stop pins 34 illustrated as three in number, which pass through the collar 29 at equidistant points and which may be adjusted so as to engage with the inner end of the hub 21 when the collar has been shifted any predetermined distance, thus limiting the degree to which the blades 24 may be turned.

For the purpose of shifting the collar 29 and thereby shifting the blades 24 from an operative position to an inoperative position, I surround the collar 29 with the annulus 35 which has an annular rib engaging in the groove 30. This annulus is connected by a link 36 to a bell crank lever 37 disposed within the chamber 12 and pivotally mounted at its corner in any usual or suitable manner. The rod or link 36 passes through the stuffing box 38. The depending end of the bell crank lever 37 is longitudinally slotted and engaged by a pin on the link 36 and the upper end of the bell crank lever is pivotally connected to a vertically extending rod 39 which extends up through the housing section 13 to any suitable point above the water level and is there screw-threaded as at 40 and engaged by a rotatable hand wheel 41 constituting a nut which bears against an abutment 42 which may be the upper end of the casing section 13. By rotating this nut in one direction the rod 39 will be lifted up, which will shift the collar 29 to the right in Fig. 2, and rotate the blades 24 into a position parallel to the axis of the hub. When, however, the nut constituted by the hand wheel 41 is rotated in the opposite direction, the pressure of the water will act to rotate the blades to their angular position until such time as the screw pins 34 engage with the inner end of the hub, when the blades will be held from further movement and the water will then act upon the blades to rotate the wheel with its maximum effect. This action of the water is secured by displacing the pivot pins of the blades 24 from a position in alinement with the axis of the blade to a position at one side thereof as will be obvious.

While I have illustrated the support and housing 11 as being mounted upon the base 10 intended to rest upon the bottom of the stream or upon any suitable foundation, yet I do not wish to limit myself to this as the housing 11 might be supported between floats, the only condition necessary being that the wheel be supported in a submerged position. Preferably the wheel is disposed in connection with an approximately tapering casing 43 which may be made of metal, concrete or any other suitable material, and which may be supported on floats or supported on the bed of the stream or otherwise arranged, this casing 42 being disposed on the up-stream side of the current wheel and having the opening at its smaller end of a size approximately that of the wheel itself, this casing acting to direct the current against the wheel and increase the force of this current.

I do not wish to be limited to the use of one wheel as batteries of these wheels may be used, in a manner which will be obvious, all of the wheels being connected to a single power transmission shaft.

In the form of my invention which is illustrated the shaft housing is to be filled with lubricating oil, or with some non-freezing compound. The stuffing boxes, of course, prevent the leakage of this compound around the shafts and rods which pass into the housing or prevent the leakage of water into the interior of the housing. Preferably the strips 22 constituting the spokes are arranged at the same angle relative to the axis of the wheel as are the blades when the blades are turned to their fully operative position, so as to impede the free passage of water and the action of the water against the blades as little as possible. It will be, of course, understood that the details of construction which I have illustrated and described can be modified in many ways without departing from the spirit of the invention as defined in the appended claims.

Having described my invention, what I claim is:—

1. A motor of the character described including a vertical housing having a supporting base, a current wheel having a shaft extending at right angles to the housing and entering the housing, a plurality of blades operatively supported upon the shaft and pivotally mounted for movement into or out of a position parallel to the shaft, said housing extending upward to a point entirely above the blades, a collar mounted upon the shaft for rotation therewith but slidable thereon, said collar having linked connection to the several blades whereby a longitudinal movement of the collar will shift the blades, a ring mounted upon the collar having a tongue engaging in a groove in the collar, a link connected to the ring extending into said housing, a bell crank lever mounted in the housing, a vertical rod extending upward through said housing and connected to the upper end of the bell crank lever, means at the upper end of the rod for vertically adjusting it to thereby adjust the blades and a driven shaft extending vertically through the housing and operatively engaged with the current wheel shaft.

2. A motor of the character described comprising a vertically disposed hollow housing, a vertical shaft carried therein, a shaft entering the housing at right angles to the vertical shaft to operatively engage therewith, a hub mounted upon the horizontal shaft, a rim disposed concentrically to the hub, spokes supporting the rim from the hub, a plurality of blades rotatably mounted in the hub and rim and adjustable into positions parallel to the axis of the shaft or into angular relation thereto, the vertical housing extending to a point entirely above said blades, a collar slidably mounted upon the shaft but rotatable therewith, a plurality of links each pivotally connected to the collar and to one of said blades, a ring surrounding the collar and having tongue and groove engagement therewith, a link connected to said ring and entering the housing, a bell crank lever mounted in the housing and engaging the link, a vertical rod connected to the bell crank and extending up through the housing, and means at the upper end of the rod for vertically adjusting it.

3. A motor of the character described comprising a vertically disposed hollow housing, a vertical shaft carried therein, a shaft entering the housing at right angles to the vertical shaft to operatively engage therewith, a hub mounted upon the horizontal shaft, a rim disposed concentrically to the hub, spokes supporting the rim from the hub, a plurality of blades rotatably mounted in the hub and rim and adjustable into positions parallel to the axis of the shaft or into angular relation thereto, said housing extending to a point entirely above the blades, a collar slidably mounted upon the shaft but rotatable therewith, a plurality of links each pivotally connected to the collar and to one of said blades, a ring surrounding the collar and having tongue and groove engagement therewith, a link connected to said ring and entering the housing, a bell crank lever mounted in the housing and engaging the link, a vertical rod connected to the bell crank and extending up through the housing, means at the upper end of the rod for vertically adjusting it, and means for adjustably limiting the movement of the collar toward the hub.

In testimony whereof I hereunto affix my signature in the presence of two witnesses.

NATHAN W. BOWMAN.

Witnesses:
 HENRY BRUNNER,
 AGNES V. FOX.

Copies of this patent may be obtained for five cents each, by addressing the "Commissioner of Patents, Washington, D. C."